US012669775B2

(12) United States Patent
Soda

(10) Patent No.: US 12,669,775 B2
(45) Date of Patent: Jun. 30, 2026

(54) COOLING DEVICE AND IMAGE FORMING APPARATUS

(71) Applicant: KYOCERA Document Solutions Inc., Osaka (JP)

(72) Inventor: Tomohisa Soda, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 254 days.

(21) Appl. No.: 18/748,806

(22) Filed: Jun. 20, 2024

(65) Prior Publication Data

US 2024/0426647 A1 Dec. 26, 2024

(30) Foreign Application Priority Data

Jun. 23, 2023 (JP) ................................ 2023-102922

(51) Int. Cl.
*G03G 21/20* (2006.01)
*G01F 23/70* (2006.01)
*G03G 21/16* (2006.01)

(52) U.S. Cl.
CPC ........... *G03G 21/20* (2013.01); *G01F 23/706* (2013.01); *G03G 21/1647* (2013.01); *G03G 2221/1696* (2013.01)

(58) Field of Classification Search
CPC ........ G01F 23/64; G01F 23/686; G01F 23/68; G01F 23/70; G01F 23/706; G03G 21/1647; G03G 21/20; G03G 2221/1696; G03G 2221/16; G03G 15/2017
See application file for complete search history.

(56) References Cited

U.S. PATENT DOCUMENTS

2012/0263491 A1* 10/2012 Fujiya .................. G03G 21/206
165/104.33

FOREIGN PATENT DOCUMENTS

| | | | | | |
|---|---|---|---|---|---|
| CN | 106338321 A | * | 1/2017 | ........... | G01F 23/706 |
| JP | 2011112707 A | | 6/2011 | | |
| JP | 2012058623 A | * | 3/2012 | | |
| JP | 2020134580 A | * | 8/2020 | | |
| JP | 2021156915 A | * | 10/2021 | | |

OTHER PUBLICATIONS

Machine translation of CN 106338321 (Year: 2017).*
Machine translation of JP 2012058623 (Year: 2012).*
Machine translation of JP 2020134580 (Year: 2020).*
Machine translation of JP 2021156915 (Year: 2021).*

* cited by examiner

*Primary Examiner* — Nathaniel J Kolb
(74) *Attorney, Agent, or Firm* — Alleman Hall LLP

(57) ABSTRACT

A floating body is stored in a tank with a coolant and has a lower density than the coolant. A swing member is swingably supported and includes a contact portion which is displaced by being brought into contact with the tank and a to-be-detected portion which moves in an interlocking manner with the displacement of the contact portion. A sensor detects the floating body or the to-be-detected portion present at a detection position. The tank includes a restriction portion which restricts a movable range of the floating body to a range in which the detection position is a lower limit. By the attachment of the tank to the attachment portion, the to-be-detected portion is displaced from the detection position to an evacuation position in the interlocking manner with the displacement of the contact portion.

6 Claims, 7 Drawing Sheets

COOLING DEVICE AND IMAGE FORMING APPARATUS

INCORPORATION BY REFERENCE

This application is based upon and claims the benefit of priority from the corresponding Japanese Patent Application No. 2023-102922 filed on Jun. 23, 2023, the entire contents of which are incorporated herein by reference.

BACKGROUND

The present disclosure relates to a cooling device to which a tank that stores a coolant is attached detachably, and an image forming apparatus.

A temperature of a device configuring an image forming apparatus tends to become high due to speed up of print processing.

For example, in an image forming apparatus that uses electrophotography, a temperature of toner stored in a developing device may become high due to frictional heat generated by stirring of the toner. There is a fear that a high temperature of the toner will cause softened toner to agglomerate so as to lower image quality.

In this regard, the image forming apparatus may include a cooling device. For example, it is known that the image forming apparatus that uses electrophotography includes a liquid-cooled cooling device which cools the developing device.

SUMMARY

A cooling device according to an aspect of the present disclosure includes a tank, an attachment portion, a pump, a heat exchange portion, a heat radiation portion, a plurality of tubes, a floating body, a swing member, and a sensor. The tank accumulates a coolant. The attachment portion is a portion to which the tank is attached detachably. The pump causes the coolant to circulate. The heat exchange portion performs heat exchange between the coolant and a cooling target. The heat radiation portion radiates heat of the coolant. The plurality of tubes couple the tank, the pump, the heat exchange portion, and the heat radiation portion and form a circulation path of the coolant. The floating body is stored in the tank together with the coolant and has a lower density than the coolant. The swing member is swingably supported by the attachment portion and includes a contact portion which is displaced by being brought into contact with the tank and a to-be-detected portion which moves in an interlocking manner with the displacement of the contact portion. The sensor is provided in the attachment portion and detects the floating body or the to-be-detected portion present at a detection position. The tank includes a restriction portion which restricts a movable range of the floating body under a situation where the tank is attached to the attachment portion to a range in which the detection position is set as a lower limit. The contact portion is displaced in accordance with attachment and detachment of the tank to/from the attachment portion. By the attachment of the tank to the attachment portion, the to-be-detected portion is displaced from the detection position to an evacuation position in the interlocking manner with the displacement of the contact portion.

An image forming apparatus according to another aspect of the present disclosure includes a sheet conveying device, a printing device, and the cooling device. The sheet conveying device conveys a sheet. The printing device forms an image on the sheet conveyed by the sheet conveying device. The cooling device cools a part of the printing device.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Hereinafter, an embodiment of the present disclosure will be described with reference to the drawings. It is noted that the following embodiment is an example of embodying the present disclosure and does not limit the technical scope of the present disclosure.

Figure 1:
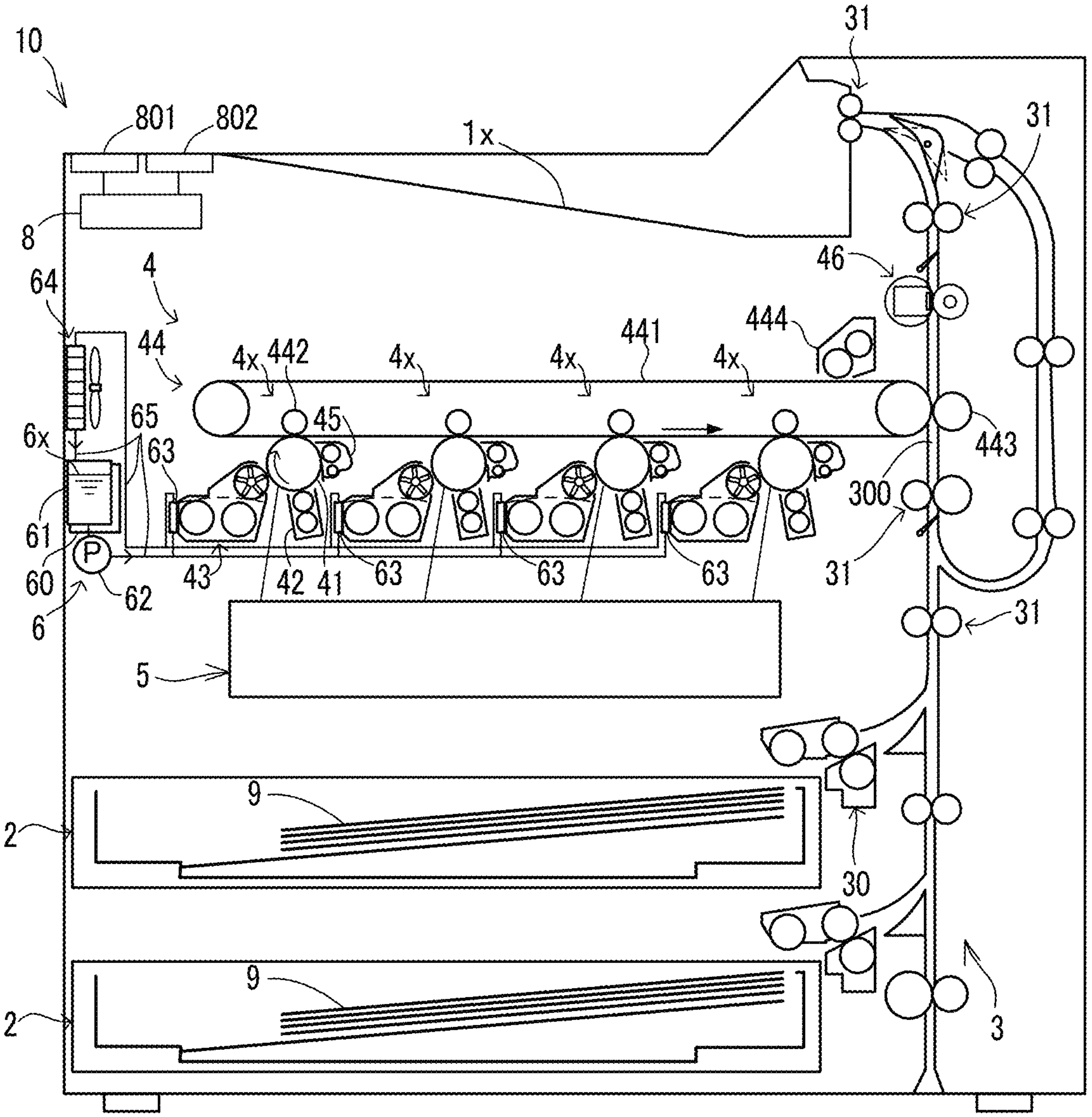
FIG. 1 is a configuration diagram of an image forming apparatus including a cooling device according to an embodiment.

A cooling device 6 according to the embodiment configures a part of an image forming apparatus 10 (see FIG. 1).

[Configuration of Image Forming Apparatus 10]

As shown in FIG. 1, the image forming apparatus 10 includes a sheet conveying device 3, a printing device 4, and the cooling device 6. The sheet conveying device 3 conveys a sheet 9.

The sheet conveying device 3 includes a sheet feed mechanism 30 and a plurality of conveying roller pairs 31. The sheet feed mechanism 30 feeds the sheets 9 stored in a sheet storing portion 2 to a conveying path 300. The conveying path 300 is a path for conveying the sheet 9.

The plurality of conveying roller pairs 31 are rotationally driven by a motor (not shown). The plurality of conveying roller pairs 31 rotate to convey the sheet 9 along the conveying path 300 and further discharge the sheet 9 onto a discharge tray 1*x*.

The printing device 4 executes print processing. The print processing is processing of forming an image on the sheet 9 conveyed by the sheet conveying device 3. The sheet 9 is an image forming medium such as a paper sheet or a sheet-type resin member.

In the present embodiment, the printing device 4 executes the print processing using electrophotography. The printing device 4 includes one or more image forming portions 4*x*, a laser scanning unit 5, a transfer device 44, and a fixing device 46.

In the example shown in FIG. 1, the image forming apparatus 10 is a tandem-type color image forming apparatus. Therefore, the printing device 4 includes a plurality of image forming portions 4*x* respectively corresponding to a plurality of toner colors.

Each of the image forming portions 4*x* includes a drum-type photoconductor 41, a charging device 42, a developing device 43, a drum cleaning device 45, and the like. In other words, the printing device 4 includes a plurality of photoconductors 41, a plurality of developing devices 43, and a plurality of drum cleaning devices 45 respectively corresponding to the plurality of toner colors.

In each of the image forming portions 4*x*, the photoconductor 41 rotates so that the charging device 42 charges a surface of the photoconductor 41. The laser scanning unit 5 scans a plurality of laser light beams onto the respective charged surfaces of the plurality of photoconductors 41. Thus, an electrostatic latent image is formed on the surface of each of the photoconductors 41.

The developing devices 43 respectively supply toner to the surfaces of the photoconductors 41 to thus develop the electrostatic latent images into toner images. The toner is granular developer. The photoconductor 41 is an example of an image-carrying member which rotates while carrying the toner image.

In the present embodiment, the printing device 4 includes four image forming portions 4*x* respectively corresponding to the toner of four development colors of yellow, cyan, magenta, and black. Accordingly, the printing device 4 includes four photoconductors 41, four developing devices 43, and four drum cleaning devices 45.

Four toner images are respectively formed on the surfaces of the four photoconductors 41. The transfer device 44 transfers the four toner images onto the sheet 9 from the four photoconductors 41.

The transfer device 44 includes an intermediate transfer belt 441, four primary transfer devices 442 respectively corresponding to the four image forming portions 4*x*, a secondary transfer device 443, and a belt cleaning device 444.

The four primary transfer devices 442 respectively transfer the toner images formed on the surfaces of the four photoconductors 41 onto a surface of the intermediate transfer belt 441. Thus, a color toner image obtained by combining the toner images of the four photoconductors 41 is formed on the surface of the intermediate transfer belt 441.

The secondary transfer device 443 transfers the color toner image formed on the intermediate transfer belt 441 onto the sheet 9 at a transfer position on the conveying path 300.

The fixing device 46 heats and pressurizes the color toner image transferred onto the sheet 9. Thus, the fixing device 46 fixes the color toner image onto the sheet 9.

The drum cleaning devices 45 respectively remove waste toner remaining on the surfaces of the photoconductors 41. The belt cleaning device 444 removes the waste toner remaining on the intermediate transfer belt 441.

The cooling device 6 includes an attachment portion 60, a tank 61, a pump 62, one or more heat exchange portions 63, a heat radiation portion 64, and a plurality of tubes 65.

The tank 61 accumulates a coolant 6*x*. In other words, the cooling device 6 is a liquid-cooled device. The attachment portion 60 is a portion to which the tank 61 is attached detachably.

The plurality of tubes 65 couple the tank 61, the pump 62, the heat exchange portions 63, and the heat radiation portion 64 and form a circulation path of the coolant 6*x*.

The pump 62 causes the coolant 6*x* to circulate in the circulation path. The heat exchange portion 63 performs heat exchange between the coolant 6*x* and a cooling target. Thus, the heat exchange portion 63 cools the cooling target having a higher temperature than the coolant 6*x*. The cooling target is a part of the printing device 4.

In the present embodiment, the cooling device 6 includes four heat exchange portions 63, and the cooling target is the four developing devices 43. In other words, the cooling device 6 cools each of the developing devices 43. The cooling device 6 suppresses a temperature rise of toner that is due to frictional heat generated by stirring of the toner in each of the developing devices 43.

The heat radiation portion 64 radiates heat of the coolant 6*x* whose temperature has risen by the heat exchange with the four developing devices 43. In the example shown in FIG. 1, the heat radiation portion 64 is an air-cooling device including a cooling fan.

The image forming apparatus 10 further includes an operation device 801, a display device 802, and a control device 8.

The operation device 801 is a device which accepts operations of people. For example, the operation device 801 includes one or both of a touch panel and operation buttons.

The display device 802 is capable of displaying various types of information. For example, the display device 802 is a panel display device such as a liquid crystal display device.

The control device 8 controls various electric devices provided in the image forming apparatus 10.

Figure 2:
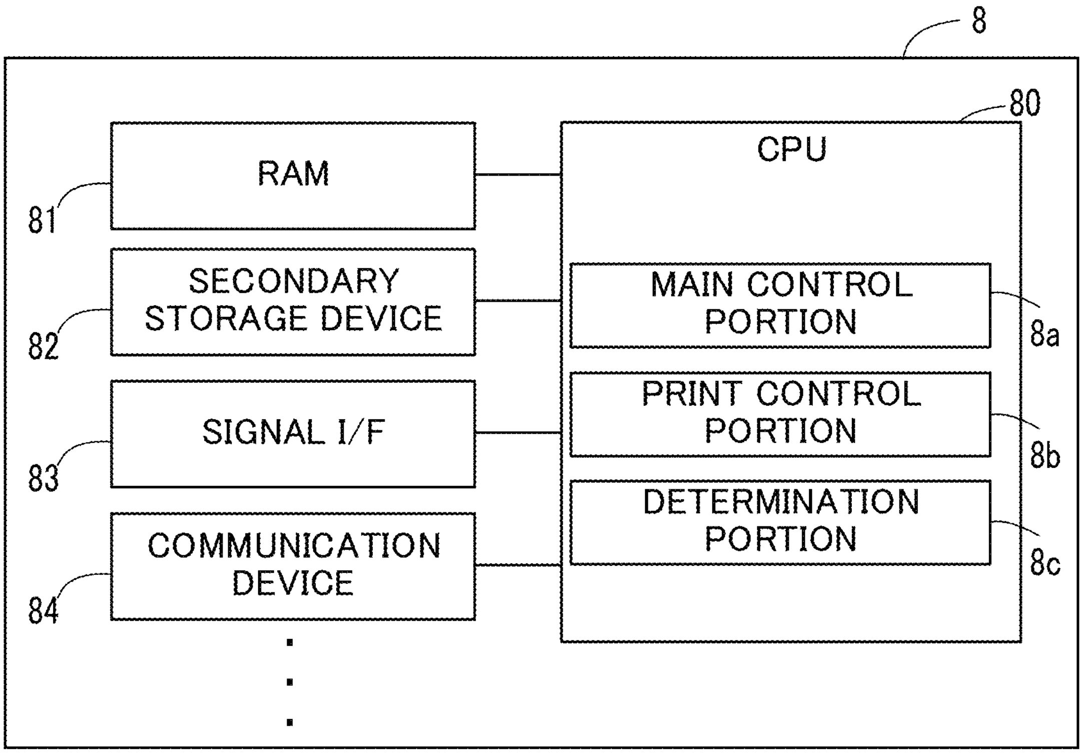
FIG. 2 is a block diagram showing a configuration of a control device in the image forming apparatus.

As shown in FIG. 2, the control device 8 includes a CPU (Central Processing Unit) 80, a RAM (Random Access Memory) 81, a secondary storage device 82, a signal interface 83, a communication device 84, and the like.

The CPU 80 executes computer programs to thus execute various types of control and data processing. The RAM 81 is a volatile storage device. The RAM 81 temporarily stores the computer programs to be executed by the CPU 80 and various types of data.

The secondary storage device 82 is a nonvolatile computer-readable storage device. The secondary storage device 82 stores the computer programs to be executed by the CPU 80 and various types of data. For example, one or both of a flash memory and a hard disk drive is/are adopted as the secondary storage device 82.

The signal interface 83 converts detection signals of various sensors into digital detection data. The detection data is transmitted to the CPU 80.

The communication device 84 executes communication with a plurality of external apparatuses including one or more host apparatuses via a network. The CPU 80 executes communication with each of the external apparatuses via the communication device 84. The host apparatus is an information processing apparatus which requests the image forming apparatus 10 to execute the print processing.

The CPU 80 includes a plurality of processing modules that are realized by executing the computer programs. The plurality of processing modules include a main control portion 8*a*, a print control portion 8*b*, a determination portion 8*c*, and the like (see FIG. 2).

The main control portion 8*a* executes control for causing the other modules to execute processing of accepting various requests and processing corresponding to the requests. For example, the main control portion 8*a* accepts a print request via the operation device 801 or the communication device 84. In addition, the main control portion 8*a* causes the print control portion 8*b* to execute processing corresponding to the print request.

The print control portion 8*b* controls the sheet conveying device 3 and the printing device 4. While causing the sheet conveying device 3 to convey the sheet 9, the print control portion 8*b* causes the printing device 4 to execute the print processing.

The determination portion 8*c* determines various states of the image forming apparatus 10 according to detection states of various sensors and operation states of various devices in the image forming apparatus 10.

Incidentally, in the liquid-cooled cooling device 6, the pump 62 causes the coolant 6*x* to circulate in the tank 61, the heat exchange portions 63, and the heat radiation portion 64. The tank 61, the pump 62, the heat exchange portions 63, and the heat radiation portion 64 are coupled by the plurality of tubes 65.

The coolant 6*x* vaporizes and also slightly leaks from a connection portion of the devices. Therefore, by using the cooling device 6 for a long period of time, an amount of the coolant 6*x* in the tank 61 gradually decreases.

When a level of the coolant 6*x* in the tank 61 falls below a normal level, the tank 61 needs to be exchanged.

In addition, when the cooling device 6 is operated in a state where the tank 61 is not attached to the attachment portion 60, an unfavorable situation such as a leakage of the coolant 6*x* and a rise in temperature of the cooling target may occur.

Accordingly, the cooling device 6 is required to have a configuration for detecting lowering of the level of the coolant 6*x* in the tank 61 and an attachment state of the tank 61.

Meanwhile, in the cooling device 6, lowering of costs by simplifying the configuration is also required.

The cooling device 6 realizes a device that is capable of detecting lowering of the level of the coolant 6*x* in the tank 61 and the attachment state of the tank 61 with a simple configuration.

[Configuration of Cooling Device 6]

Figure 3:
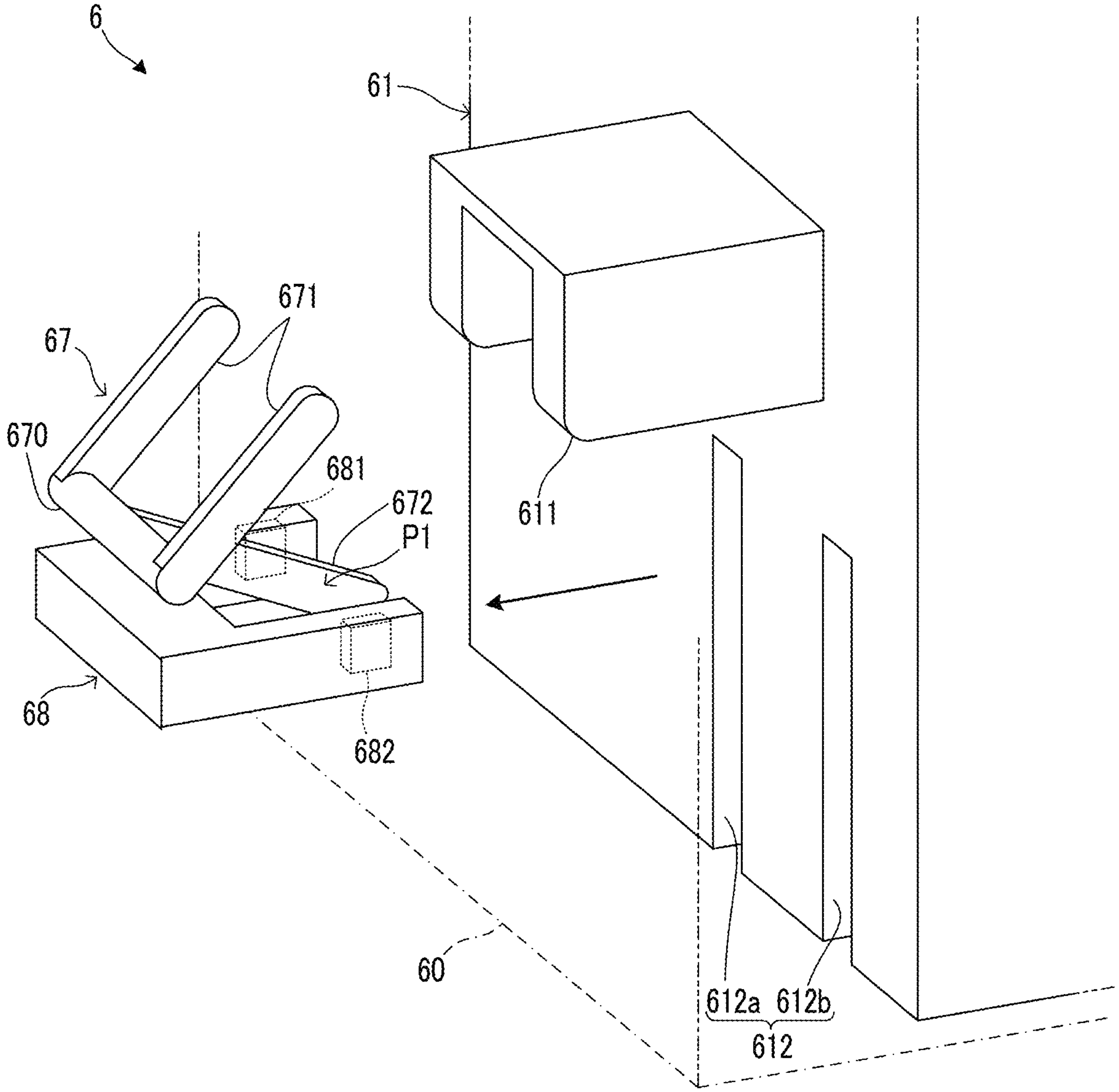
FIG. 3 is a perspective view showing a main portion of the cooling device according to the embodiment.
Figure 4:
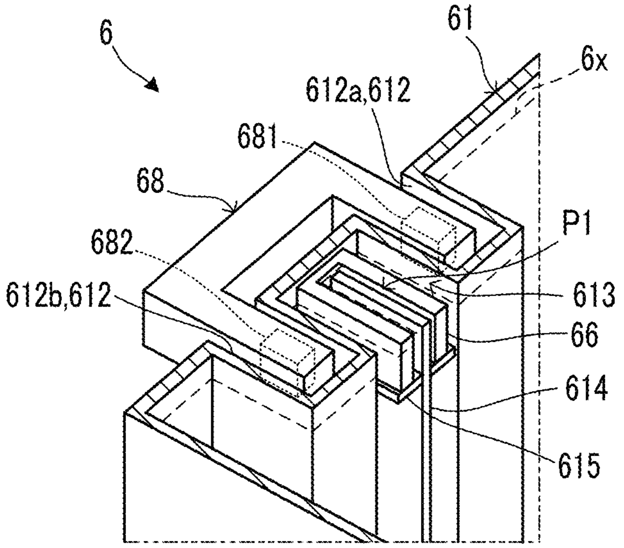
FIG. 4 is a partial end surface perspective view of a tank and a sensor in the cooling device according to the embodiment.

The cooling device 6 further includes a swing member 67 and a sensor 68 shown in FIG. 3 and a floating body 66 shown in FIG. 4.

The floating body 66 is stored in the tank 61 together with the coolant 6*x*. The floating body 66 has a lower density than the coolant 6*x*. Accordingly, the floating body 66 floats on a surface layer of the coolant 6*x* if its movable range is not restricted.

The tank 61 includes a lateral restriction portion 614 and a lower restriction portion 615 that restrict a movement range of the floating body 66 (see FIG. 4).

The lateral restriction portion 614 restricts a movement of the floating body 66 in a horizontal direction. The lateral restriction portion 614 is also a guide portion which guides the floating body 66 in an up-down direction.

Under a situation where the tank 61 is attached to the attachment portion 60, the lower restriction portion 615 restricts a movable range of the floating body 66 in the up-down direction to a range in which a detection position P1 is set as a lower limit. When the level of the coolant 6*x* in the tank 61 is a level higher than the detection position P1, the position of the floating body 66 in the up-down direction indicates the level of the coolant 6*x* in the tank 61.

The swing member 67 is swingably supported by the attachment portion 60. The swing member 67 includes a shaft portion 670, a contact portion 671, and a to-be-detected portion 672. The shaft portion 670 is rotatably supported by the attachment portion 60.

The contact portion 671 is formed to extend from the shaft portion 670 along a diametrical direction of the shaft portion 670. The contact portion 671 is rotatable about the shaft portion 670. The contact portion 671 is displaced in accordance with attachment and detachment of the tank 61 to/from the attachment portion 60.

Figure 5:
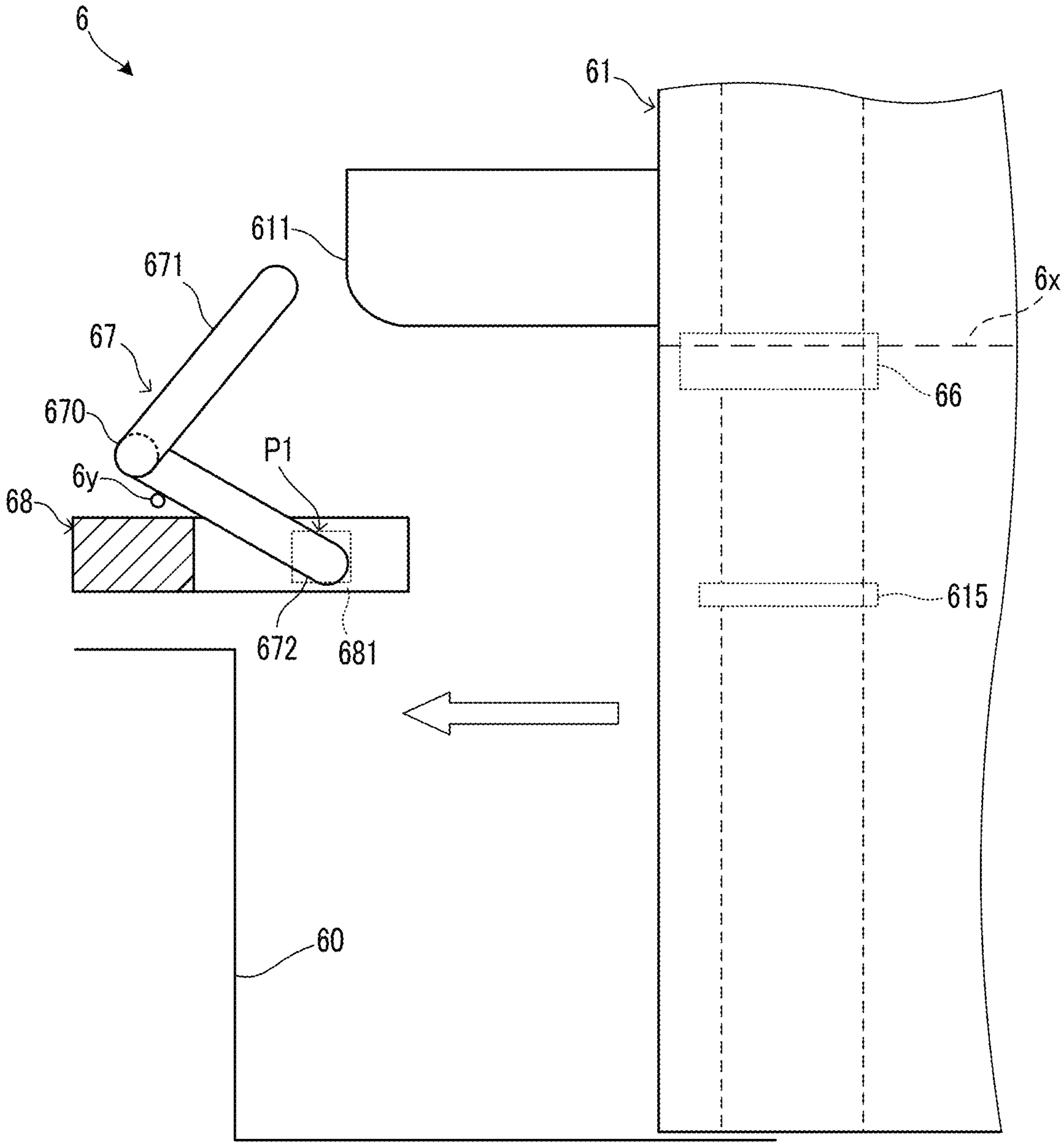
FIG. 5 is a first side view showing the main portion of the cooling device according to the embodiment (a state before the tank is attached)
Figure 6:
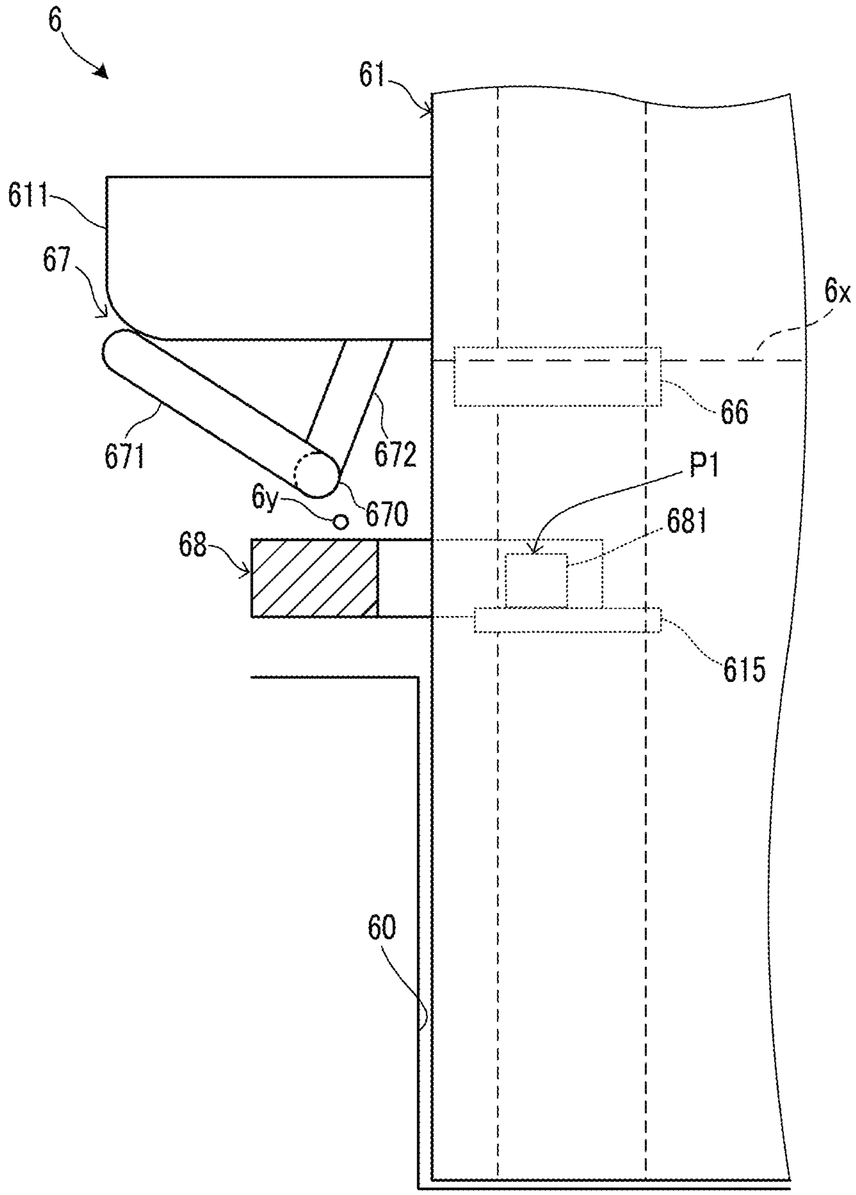
FIG. 6 is a second side view showing the main portion of the cooling device according to the embodiment (a state where the tank is attached)

When the tank 61 is attached to the attachment portion 60, the contact portion 671 comes into contact with a part of the tank 61 to be displaced from a first position to a second position (see FIG. 5 and FIG. 6).

FIG. 5 shows a state where the contact portion 671 is present at the first position, and FIG. 6 shows a state where the contact portion 671 is present at the second position.

When the tank 61 is removed from the attachment portion 60, the contact portion 671 is displaced from the second position to the first position by a weight of the swing member 67 (see FIG. 5).

When the tank 61 is not attached to the attachment portion 60, a latch portion 6*y* latches a part of the swing member 67 so that the contact portion 671 is retained at the first position (see FIG. 5).

The to-be-detected portion 672 is formed to extend from the shaft portion 670 along the diametrical direction of the shaft portion 670. The to-be-detected portion 672 is rotatable about the shaft portion 670.

The to-be-detected portion 672 is displaced between the detection position P1 and an evacuation position in an interlocking manner with the displacement of the contact portion 671. FIG. 3 and FIG. 5 each show a state where the to-be-detected portion 672 is present at the detection position P1, and FIG. 6 and FIG. 7 each show a state where the to-be-detected portion 672 is present at the evacuation position.

When the contact portion 671 is displaced from the first position to the second position, the to-be-detected portion 672 is displaced from the detection position P1 to the evacuation position (see FIG. 5 and FIG. 6).

In other words, by attaching the tank 61 to the attachment portion 60, the to-be-detected portion 672 is displaced from the detection position P1 to the evacuation position in an interlocking manner with the displacement of the contact portion 671.

On the other hand, when the contact portion 671 is displaced from the second position to the first position, the to-be-detected portion 672 is displaced from the evacuation position to the detection position P1 (see FIG. 5).

In other words, by removing the tank 61 from the attachment portion 60, the to-be-detected portion 672 is displaced from the evacuation position to the detection position P1.

When the tank 61 is not attached to the attachment portion 60, the latch portion 6*y* latches a part of the swing member 67 so that the to-be-detected portion 672 is retained at the detection position P1 (see FIG. 5).

The sensor 68 is provided in the attachment portion 60. The sensor 68 detects the floating body 66 or the to-be-detected portion 672 present at the detection position P1.

In the present embodiment, the sensor 68 is a light sensor including a light-emitting portion 681 and a light-receiving portion 682 (see FIG. 3 and FIG. 4). The light-emitting portion 681 emits detection light toward the detection position P1. The light-receiving portion 682 receives the detection light that has passed through the detection position P1 or the detection light reflected at the detection position P1.

A portion of the tank 61 opposing at least the light-emitting portion 681 is formed by a transparent member that the detection light permeates. The detection light also permeates the coolant 6*x*.

In the present embodiment, the sensor 68 is a transmissive light sensor. Therefore, the light-emitting portion 681 and the light-receiving portion 682 are arranged opposed to each other via the detection position P1. The light-receiving portion 682 receives the detection light that has passed through the detection position P1.

When the floating body 66 or the to-be-detected portion 672 is present at the detection position P1, the detection light is blocked by the floating body 66 or the to-be-detected portion 672. In this case, a light reception amount of the light-receiving portion 682 is small.

On the other hand, when both of the floating body 66 and the to-be-detected portion 672 are present at positions outside the detection position P1, the detection light passes through the detection position P1 and enters the light-receiving portion 682. In this case, the light reception amount of the light-receiving portion 682 is large.

The light-receiving portion 682 includes a photoelectric conversion element. The light-receiving portion 682 outputs a detection signal expressing the light reception amount of the detection light to the control device 8.

The tank 61 includes a pair of concave portions 612 formed to be concave on an outer side surface of the tank 61 (see FIG. 3 and FIG. 4). The pair of concave portions 612 include a first concave portion 612*a* and a second concave portion 612*b*.

When the tank 61 is attached to the attachment portion 60, the light-emitting portion 681 of the sensor 68 is inserted into the first concave portion 612*a*, and the light-receiving portion 682 of the sensor 68 is inserted into the second concave portion 612*b* (see FIG. 4).

A floating body storing portion 613 that extends in the up-down direction is formed between the pair of concave portions 612 in the tank 61. The floating body 66 is capable of moving inside the floating body storing portion 613 in accordance with the level of the coolant 6*x*.

In the state where the tank 61 is attached to the attachment portion 60, a part of the floating body storing portion 613 is arranged at the detection position P1 (see FIG. 4).

In the present embodiment, when the level of the coolant 6*x* in the tank 61 is within an allowable range, the floating body 66 floats on the surface layer of the coolant 6*x* at a position higher than the detection position P1 (see FIG. 6). In this case, the sensor 68 detects neither the to-be-detected portion 672 nor the floating body 66.

Figure 7:
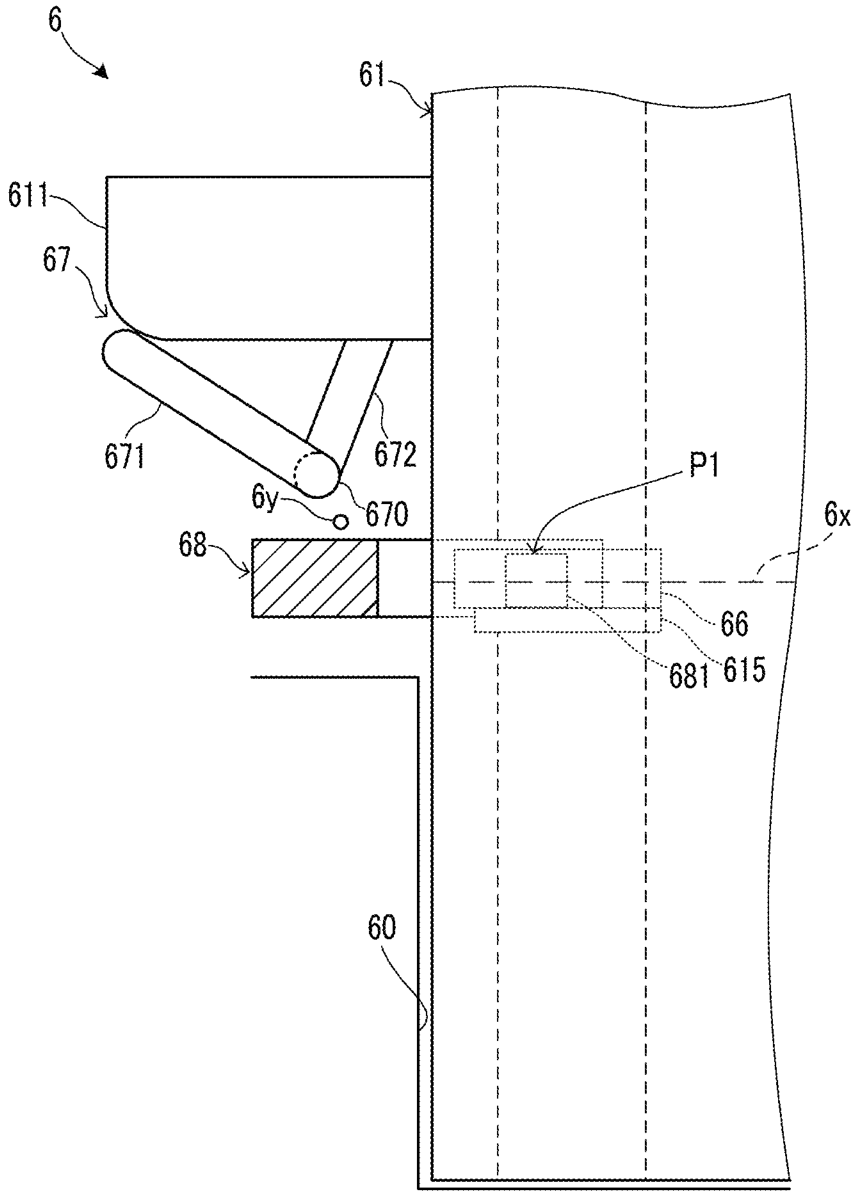
FIG. 7 is a third side view showing the main portion of the cooling device according to the embodiment (a state where a level of a coolant is below a reference level).

On the other hand, when the level of the coolant 6*x* in the tank 61 falls below the allowable range, the floating body 66 is retained at the detection position P1 by the lower restriction portion 615 (see FIG. 4 and FIG. 7). In this case, the sensor 68 detects the floating body 66.

The determination portion 8*c* determines a normal state and an abnormal state of the tank 61 based on the detection signal of the sensor 68. In the present embodiment, the determination portion 8*c* which determines the state of the tank 61 configures a part of the cooling device 6. It is noted that the CPU 80 is an example of a processor which determines the state of the tank 61.

The normal state is a state where the tank 61 is attached to the attachment portion 60 and the level of the coolant 6*x* in the tank 61 is within the allowable range (see FIG. 6). On the other hand, the abnormal state is a state where the tank 61 is not attached to the attachment portion 60 or the level of the coolant 6*x* in the tank 61 falls below the allowable range (see FIG. 5 and FIG. 7).

When the detection signal of the sensor 68 indicates a state where an object is present at the detection position P1, the determination portion 8*c* determines that the tank 61 is in the abnormal state. On the other hand, when the detection signal of the sensor 68 indicates a state where an object is not present at the detection position P1, the determination portion 8*c* determines that the tank 61 is in the normal state.

In the present embodiment, when the detection signal of the sensor 68 indicates a state where the light reception amount of the light-receiving portion 682 exceeds a reference amount, the determination portion 8*c* determines that the tank 61 is in the normal state. On the other hand, when the detection signal of the sensor 68 indicates a state where the light reception amount of the light-receiving portion 682 falls below the reference amount, the determination portion 8*c* determines that the tank 61 is in the abnormal state.

When determining that the tank 61 is in the abnormal state, the determination portion 8*c* notifies the abnormal state via the display device 802.

In addition, when determined that the tank 61 is in the abnormal state, the print control portion 8*b* may restrict execution of the print processing.

For example, when determined that the tank 61 is in the abnormal state, the print control portion 8*b* prohibits the execution of the print processing. Alternatively, when determined that the tank 61 is in the abnormal state, the print control portion 8*b* may restrict the number of sheets to be subjected to continuous printing.

By adopting the cooling device 6, the lowering of the level of the coolant 6*x* and the unattached state of the tank 61 can be detected with a single sensor 68.

First Application Example

In the cooling device 6, a magnetic sensor may be adopted as the sensor 68. In this case, the to-be-detected portion 672 and the floating body 66 include a magnetic body. Alternatively, an ultrasonic sensor may be adopted as the sensor 68.

Second Application Example

The cooling target of the cooling device 6 may be a device other than the developing device 43 in the image forming apparatus 10. For example, the cooling device 6 may cool the fixing device 46.

Third Application Example

The cooling device 6 may be applied to an inkjet image forming apparatus. For example, the cooling device 6 may cool an inkjet head.

NOTES OF DISCLOSURE

Hereinafter, a general outline of the disclosure extracted from the embodiment described above will be noted. It is noted that the respective configurations and processing functions described in the notes below can be sorted and arbitrarily combined as appropriate.

<Note 1>

A cooling device, including:

a tank which accumulates a coolant;

an attachment portion to which the tank is attached detachably;
a pump which causes the coolant to circulate;
a heat exchange portion which performs heat exchange between the coolant and a cooling target;
a heat radiation portion which radiates heat of the coolant;
a plurality of tubes which couple the tank, the pump, the heat exchange portion, and the heat radiation portion and form a circulation path of the coolant;
a floating body which is stored in the tank together with the coolant and has a lower density than the coolant;
a swing member which is swingably supported by the attachment portion and includes a contact portion which is displaced by being brought into contact with the tank and a to-be-detected portion which moves in an interlocking manner with the displacement of the contact portion; and
a sensor which is provided in the attachment portion and detects the floating body or the to-be-detected portion present at a detection position, in which
the tank includes a restriction portion which restricts a movable range of the floating body under a situation where the tank is attached to the attachment portion to a range in which the detection position is set as a lower limit,
the contact portion is displaced in accordance with attachment and detachment of the tank to/from the attachment portion, and
by the attachment of the tank to the attachment portion, the to-be-detected portion is displaced from the detection position to an evacuation position in the interlocking manner with the displacement of the contact portion.

<Note 2>

The cooling device according to Note 1, further including
a processor which determines, based on a detection signal of the sensor, a normal state where the tank is attached to the attachment portion and a level of the coolant in the tank is within an allowable range and an abnormal state where the tank is not attached to the attachment portion or the level of the coolant in the tank falls below the allowable range.

<Note 3>

The cooling device according to Note 1 or 2, in which
the sensor is a light sensor including a light-emitting portion which emits detection light toward the detection position and a light-receiving portion which receives the detection light that has passed through the detection position or the detection light reflected at the detection position.

<Note 4>

The cooling device according to Note 3, in which
the tank includes
a first concave portion which is formed to be concave on an outer side surface and into which the light-emitting portion is inserted, and
a second concave portion which is formed to be concave on the outer side surface and into which the light-receiving portion is inserted.

<Note 5>

An image forming apparatus, including:
a sheet conveying device which conveys a sheet;
a printing device which forms an image on the sheet conveyed by the sheet conveying device; and
the cooling device according to any one of Notes 1 to 4 which cools a part of the printing device.

<Note 6>

The image forming apparatus according to Note 5, in which
the printing device includes
a photoconductor on which an electrostatic latent image is formed on a surface thereof,
a developing device which supplies toner to the surface of the photoconductor to develop the electrostatic latent image into a toner image, and
a transfer device which transfers the toner image from the surface of the photoconductor onto the sheet, and
the cooling device cools the developing device.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. A cooling device, comprising:
a tank which accumulates a coolant;
an attachment portion to which the tank is attached detachably;
a pump which causes the coolant to circulate;
a heat exchange portion which performs heat exchange between the coolant and a cooling target;
a heat radiation portion which radiates heat of the coolant;
a plurality of tubes which couple the tank, the pump, the heat exchange portion, and the heat radiation portion and form a circulation path of the coolant;
a floating body which is stored in the tank together with the coolant and has a lower density than the coolant;
a swing member which is swingably supported by the attachment portion and includes a contact portion which is displaced by being brought into contact with the tank and a to-be-detected portion which moves in an interlocking manner with the displacement of the contact portion; and
a sensor which is provided in the attachment portion and detects the floating body or the to-be-detected portion present at a detection position, wherein
the tank includes a restriction portion which restricts a movable range of the floating body under a situation where the tank is attached to the attachment portion to a range in which the detection position is set as a lower limit,
the contact portion is displaced in accordance with attachment and detachment of the tank to/from the attachment portion, and
by the attachment of the tank to the attachment portion, the to-be-detected portion is displaced from the detection position to an evacuation position in the interlocking manner with the displacement of the contact portion.

2. The cooling device according to claim 1, further comprising
a processor which determines, based on a detection signal of the sensor, a normal state where the tank is attached to the attachment portion and a level of the coolant in the tank is within an allowable range and an abnormal state where the tank is not attached to the attachment portion or the level of the coolant in the tank falls below the allowable range.

3. The cooling device according to claim 1, wherein
the sensor is a light sensor including a light-emitting portion which emits detection light toward the detection position and a light-receiving portion which receives the detection light that has passed through the detection position or the detection light reflected at the detection position.

4. The cooling device according to claim 3, wherein the tank includes a first concave portion which is formed to be concave on an outer side surface and into which the light-emitting portion is inserted, and a second concave portion which is formed to be concave on the outer side surface and into which the light-receiving portion is inserted.

5. An image forming apparatus, comprising:

a sheet conveying device which conveys a sheet;

a printing device which forms an image on the sheet conveyed by the sheet conveying device; and the cooling device according to claim 1 which cools a part of the printing device.

6. The image forming apparatus according to claim 5, wherein the printing device includes a photoconductor on which an electrostatic latent image is formed on a surface thereof, a developing device which supplies toner to the surface of the photoconductor to develop the electrostatic latent image into a toner image, and a transfer device which transfers the toner image from the surface of the photoconductor onto the sheet, and the cooling device cools the developing device.

* * * * *